US012793994B2

(12) United States Patent
Sirac et al.

(10) Patent No.: US 12,793,994 B2
(45) Date of Patent: Nov. 10, 2026

(54) STACK OF FUEL CELL CELLS AND FUEL CELL COMPRISING SUCH A STACK

(71) Applicant: L'Air Liquide, Societe Anonyme pour l'Etude et l'Exploitation des Procedes Georges Claude, Paris (FR)

(72) Inventors: Denis Sirac, Sassenage (FR); Johan Andre, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 512 days.

(21) Appl. No.: 18/562,826

(22) PCT Filed: Apr. 1, 2022

(86) PCT No.: PCT/EP2022/058782
§ 371 (c)(1),
(2) Date: Nov. 20, 2023

(87) PCT Pub. No.: WO2022/248107
PCT Pub. Date: Dec. 1, 2022

(65) Prior Publication Data

US 2024/0266560 A1 Aug. 8, 2024

(30) Foreign Application Priority Data

May 25, 2021 (FR) ...................................... 2105419

(51) Int. Cl.
*H01M 8/04029* (2016.01)
*H01M 8/10* (2016.01)
(Continued)

(52) U.S. Cl.
CPC ..... *H01M 8/04029* (2013.01); *H01M 8/1004* (2013.01); *H01M 8/241* (2013.01); *H01M 8/2483* (2016.02); *H01M 2008/1095* (2013.01)

(58) Field of Classification Search
None
See application file for complete search history.

(56) References Cited

U.S. PATENT DOCUMENTS 8,367,268 B2 * 2/2013 Charlat ............... H01M 8/0284 429/511
10,276,881 B2 * 4/2019 Cerceau ............ H01M 8/04089
(Continued)

FOREIGN PATENT DOCUMENTS

| | | |
|---|---|---|
| DE | 10 2017 105464 | 9/2018 |
| EP | 1 526 594 | 4/2005 |
| FR | 3 030 120 | 6/2016 |

OTHER PUBLICATIONS

PCT Search Report and Written Opinion for PCT/EP2022/058782, mailed Jan. 17, 2023.
French Search Report for FR 2 105 419, mailed Feb. 11, 2022.

*Primary Examiner* — Kevin M Bernatz
(74) *Attorney, Agent, or Firm* — Justin K. Murray

(57) ABSTRACT

The invention relates to an assembly comprising a stack of a plurality of fuel cell cells, the plurality comprising a first cell at a first end of the stack and a last cell at a second end of the stack, each cell comprising an anode plate and a cathode plate, each plate comprising a reactive face and a cooling face, one of the plates of the last cell forming, with one of the plates of another of the cells, a last inter-cell cooling circuit, the other of the plates of the last cell forming a last end plate, the assembly comprising a closure plate comprising an electric current collection face and a closure face fixed to the cooling face of the last end plate.

10 Claims, 1 Drawing Sheet

(51) Int. Cl.
*H01M 8/1004* (2016.01)
*H01M 8/241* (2016.01)
*H01M 8/2483* (2016.01)

(56) References Cited

U.S. PATENT DOCUMENTS

| | | | | |
|---|---|---|---|---|
| 2006/0110649 | A1* | 5/2006 | Nishiyama .......... | H01M 8/0263 429/457 |
| 2006/0110650 | A1* | 5/2006 | Sugiura ............... | H01M 8/0276 429/457 |
| 2008/0233447 | A1 | 9/2008 | Gemba et al. | |
| 2023/0327143 | A1* | 10/2023 | Ranieri ............... | H01M 8/0254 429/480 |
| 2025/0149609 | A1* | 5/2025 | Sirac ..................... | H01M 8/241 |

* cited by examiner

[Fig. 1]
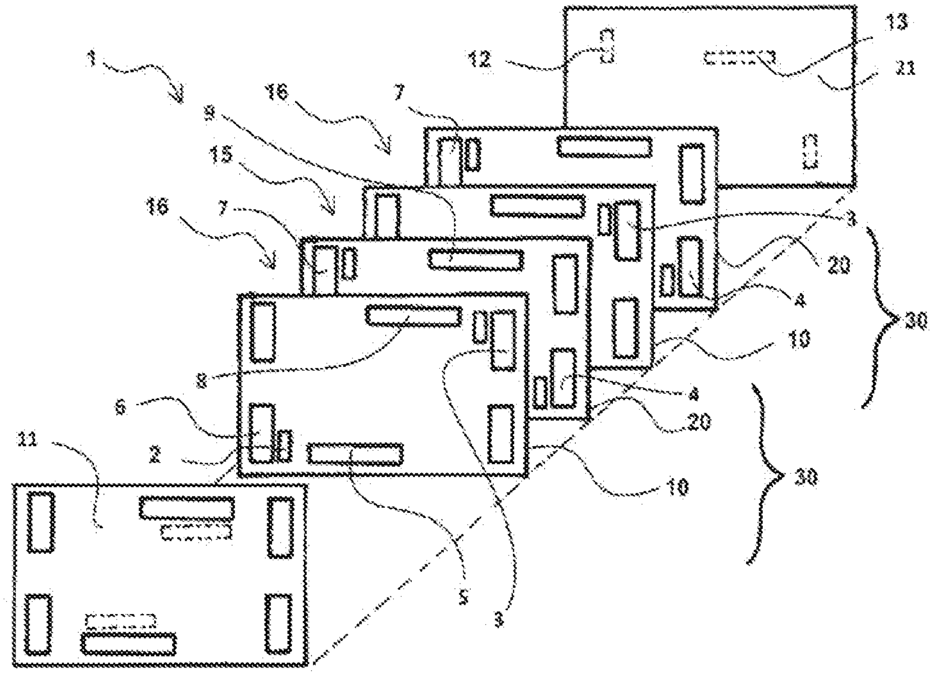
[Fig. 2]
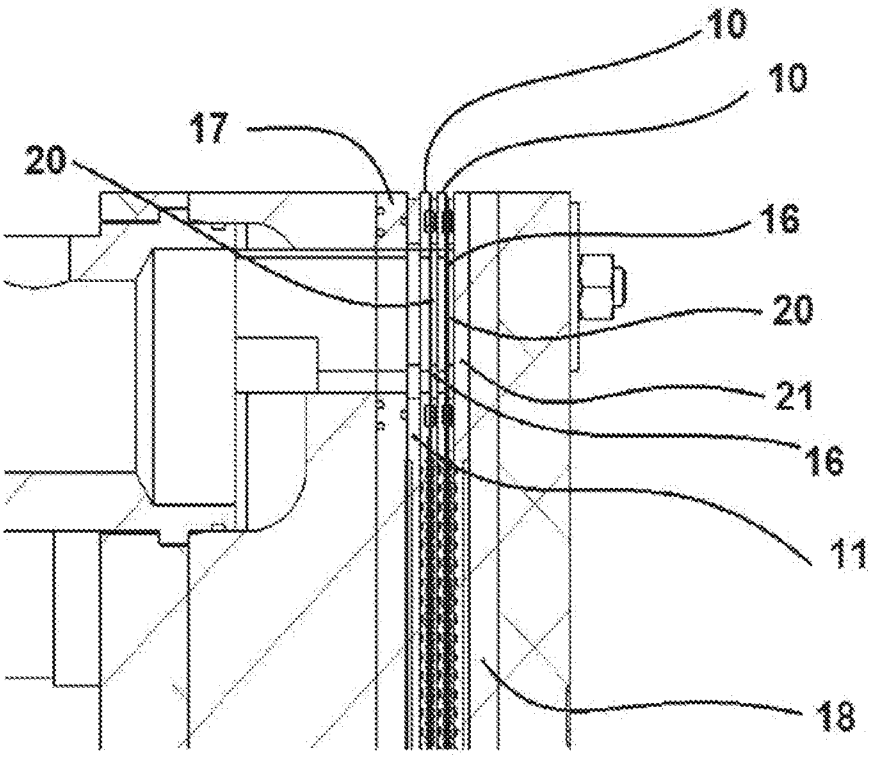

STACK OF FUEL CELL CELLS AND FUEL CELL COMPRISING SUCH A STACK

CROSS REFERENCE TO RELATED APPLICATIONS

This application is a § 371 of International PCT Application PCT/EP2022/058782, filed Apr. 1, 2022, which claims the benefit of FR2105419, filed May 25, 2021, both of which are herein incorporated by reference in their entireties.

FIELD OF THE INVENTION

The present invention relates to an assembly comprising a stack of cells of a fuel cell and a fuel cell comprising such an assembly.

More particularly, the invention relates to an assembly comprising a stack of a plurality of cells of a fuel cell of the proton exchange membrane type, in which each of the cells comprises a membrane/electrode assembly (MEA) sandwiched between an anode plate and a cathode plate.

BACKGROUND OF THE INVENTION

This is because the cells of a fuel cell (anode side and cathode side) generate heat (the chemical reactions within the cell are exothermic) and have to be cooled by a cooling circuit.

In the case of a cell composed of two plates sandwiching a membrane/electrode assembly (MEA), each plate (anode or cathode plate) comprises a side for the circulation of the reactive gases (air or hydrogen facing the membrane/electrode assembly) and a side (facing the outside of the cell) for the circulation of the cooling fluid (often a liquid).

Since the cell stack terminates at each end in a half cooling circuit, a means must be found for sealing this half cooling circuit in a simple and gas-tight manner, while allowing the correct flow of reactive gas on the membrane/electrode assembly side.

In particular, the passage of cooling liquid through internal manifolds makes it essential to seal the interface correctly at the last cell and the end of the stack, while providing effective cooling at this point.

SUMMARY OF THE INVENTION

In certain embodiments, the present invention is intended to provide an effective solution to these difficulties by proposing a stack of a plurality of fuel cell cells of the proton exchange membrane type, the plurality of cells comprising a first cell at a first end of the stack and a last cell at a second end of the stack, each cell of the plurality comprising an anode plate and a cathode plate sandwiching a membrane/electrode assembly, each plate comprising a reactive face and a cooling face, opposed to one another, the reactive face of each plate being intended to face the membrane/electrode assembly and being provided with relief elements and hollows forming a reactant circuit for the circulation of a reactant fluid, the cooling face of the cathode plate of at least one of the cells being intended to face the cooling face of the anode plate of another of the cells, with relief elements and hollows defined between them to form an inter-cell cooling circuit for the circulation of a cooling fluid, each plate comprising a reactant inlet manifold, which is formed through the plate and is in fluid communication with the reactant circuit, a reactant outlet manifold which is formed through the plate and is in fluid communication with the reactant circuit, a cooling fluid inlet manifold formed through the plate, a cooling fluid outlet manifold formed through the plate, one of the plates of the first cell forming, with one of the plates of another of the cells, a first inter-cell cooling circuit, the other of the plates of the first cell forming a first end plate, one of the plates of the last cell forming, with one of the plates of another of the cells, a last inter-cell cooling circuit, the other of the plates of the last cell forming a last end plate, the assembly comprising a closure plate including an electric current collection face intended to face a first electric current collection plate and a closure face fixed to the cooling face of the last end plate, the closure face and the cooling face of the last end plate defining between them relief elements and hollows for forming a last cooling circuit for the circulation of the cooling fluid, the closure plate having no through hole for the passage of the cooling fluid through the closure plate or for the passage of the reactant fluid through the closure plate.

Such an assembly provides optimal sealing at one of the ends of the stack, notably the end of the stack having no fluid connector. Furthermore, such a closure plate forming the last cooling circuit makes it possible to reduce the number of parts used to provide sealing at one or more ends of the stack, notably at the end which has no fluid connector, for example the end having no piping for the inlet/outlet of cooling fluid or reactant fluid. This can simplify the construction of such an assembly.

According to one embodiment, the closure face is bonded or welded to the cooling face of the last end plate.

In a variant, the closure plate and the last end plate form a single piece manufactured by molding and/or machining and/or hydroforming and/or pressing and/or three-dimensional printing.

According to one embodiment, the assembly has no flexible seal between the closure face and the cooling face of the last end plate.

According to one embodiment, the assembly has no seal fitted by clamping between the closure face and the cooling face of the last end plate.

According to one embodiment, the assembly has no O-ring seal fitted between the closure face and the cooling face of the last end plate.

According to one embodiment, the closure face is fixed to the cooling face of the last end plate so as to form between them a first sealant bead, at least one portion of which forms a loop around the cooling fluid inlet manifold.

According to one embodiment, the closure face is fixed to the cooling face of the last end plate so as to form between them a second sealant bead, at least one portion of which forms a loop around the cooling fluid outlet manifold.

According to one embodiment, the closure face is fixed to the cooling face of the last end plate so as to form a third sealant bead, at least one portion of which forms a loop around the last cooling circuit.

According to one embodiment, the first, second and third beads are arranged to allow the cooling fluid entering via the cooling fluid inlet manifold to circulate only in the last cooling circuit and to flow out only via the cooling fluid outlet manifold According to one embodiment, the closure face is fixed to the cooling face of the last end plate so as to form a fourth sealant bead, at least one portion of which forms a loop around the reactant inlet manifold.

According to one embodiment, the fourth sealant bead is arranged so as to allow the reactant fluid entering via the inlet manifold to circulate only toward the reactive face.

According to one embodiment, the closure face is fixed to the cooling face of the last end plate so as to form a fifth sealant bead, at least one portion of which forms a loop around the reactant outlet manifold.

According to one embodiment, the fifth sealant bead is arranged so as to allow the reactant fluid circulating on the reactive face to flow out only via the reactant outlet manifold.

According to one embodiment, the assembly comprises a distribution plate comprising an outer face intended to face a plate forming an interface with cooling fluid inlet and outlet piping and with reactant fluid inlet and outlet piping, the distribution plate comprising an inner face fixed to the cooling face of the first end plate, the inner face and the cooling face of the first end plate defining relief elements and hollows between them to form a first cooling circuit for the circulation of the cooling fluid.

According to one embodiment, the distribution plate comprises a plurality of through holes, for the passage of the cooling fluid and of the reactant fluid, respectively, through the distribution plate, notably in such a way as to allow these fluids to be distributed from the interface plate to the first end plate.

According to one embodiment, the inner face is bonded or welded to the cooling face of the first end plate.

In a variant, the distribution plate and the first end plate form a single piece manufactured by molding and/or machining and/or hydroforming and/or pressing and/or three-dimensional printing.

According to one embodiment, the inner face is fixed to the cooling face of the first end plate so as to form between them a sixth sealant bead of which at least one portion forms a loop around the cooling fluid inlet manifold, and/or a seventh sealant bead of which at least one portion forms a loop around the cooling fluid outlet manifold, and/or an eighth sealant bead of which at least one portion forms a loop around the reactant fluid inlet manifold, and/or a ninth sealant bead of which at least one portion forms a loop around the reactant fluid inlet manifold.

According to one embodiment, the inner face is fixed to the cooling face of the first end plate so as to form between them a tenth sealant bead of which at least one portion forms a loop around the first cooling circuit.

According to one embodiment, the sixth bead is arranged so as to allow the cooling fluid entering via the cooling fluid inlet manifold to circulate only through said manifold and in the first cooling circuit.

According to one embodiment, the seventh sealant bead is arranged so as to allow the cooling fluid circulating in the first cooling circuit to flow out only via the cooling fluid outlet manifold.

According to one embodiment, the cooling face of the cathode plate of at least one of the cells is fixed, notably bonded and/or welded, to the cooling face of the anode plate of another of the cells, so as to form a seal, notably around the inter-cell cooling circuit.

In a variant, a seal is interposed between the cooling face of the cathode plate of at least one of the cells and the cooling face of the anode plate of another of the cells, so as to form a seal, notably around the inter-cell cooling circuit.

The invention also relates to a fuel cell comprising an assembly as described above, a first electric current collection plate, a second electric current collection plate and a plate forming an interface with inlet and outlet piping for the cooling fluid and the reactant fluid.

According to one embodiment, the cell comprises a first electrically insulating plate and a first clamping plate, the first electrically insulating plate being positioned between the first collecting plate and the first clamping plate.

According to one embodiment, the cell comprises a second electrically insulating plate and a second clamping plate, the second electrically insulating plate being positioned between the second collecting plate and the second clamping plate.

BRIEF DESCRIPTION OF THE DRAWINGS

The invention will be more readily understood by the perusal of the following description and of the figures. These figures are given only by way of illustration and do not in any way limit the invention.

FIG. 1 is a schematic perspective depiction of an assembly according to the invention; and FIG. 2 is a schematic depiction of a portion of a cell according to the invention.

DETAILED DESCRIPTION OF THE INVENTION

Those elements which are identical, similar or analogous keep the same reference from one figure to the next.

FIG. 1 shows an assembly 1 including a stack of a plurality of fuel cell cells (30) of the proton exchange membrane type.

The plurality of cells 30 comprises a first cell 30 at a first end of the stack and a last cell 30 at a second end of the stack.

Each cell 30 of the plurality comprises an anode plate 10 and a cathode plate 20 sandwiching a membrane/electrode assembly 16.

Each plate 10, 20 comprises a reactive face and a cooling face opposed to one another, the reactive face of each plate 10, 20 being intended to face the membrane/electrode assembly 16 and being provided with relief elements and hollows forming a reactant circuit for the circulation of a reactant fluid.

As seen in FIG. 1, the cooling face of the cathode plate 20 of at least one of the cells 30 is intended to face the cooling face of the anode plate 10 of another of the cells 30, defining between them relief elements and hollows to form an inter-cell cooling circuit 15 for the circulation of a cooling fluid.

In the example of FIG. 1, each plate 10, 20 comprises:

- a reactant inlet manifold 3, 4 which is formed through the plate 10, 20 and is in fluid communication with the reactant circuit via a first aperture 2 formed through the plate 10, 20;

a reactant outlet manifold 6, 7 which is formed through the plate 10, 20 and is in fluid communication with the reactant circuit via a second aperture 2 formed through the plate 10, 20;

a cooling fluid inlet manifold 5 formed through the plate 10, 20;

a cooling fluid outlet manifold 8, 9 formed through the plate 10, 20.

at least two orifices formed through the plate 10, 20, each orifice being arranged to allow fluid communication only through the plate 10, 20, without being in fluid communication with the reactant circuit.

The reactant inlet manifold 3 of an anode plate 10 is in fluid communication with one of the orifices of a cathode plate 20 and the reactant outlet manifold 6 of the anode plate 10 is in fluid communication with another of the orifices of the cathode plate 20.

The reactant inlet manifold 3 of a cathode plate 20 is in fluid communication with one of the orifices of an anode plate 10 and the reactant outlet manifold 6 of the cathode plate 20 is in fluid communication with another of the orifices of the anode plate 10.

Thus the stack allows a dedicated distribution of the reactant fluid dedicated for the anode plates 10 and a dedicated distribution of the reactant fluid for the cathode plate 20, forming two independent circuits.

One of the plates 10, 20 of the first cell 30 forms, with one of the plates 10, 20 of another of the cells 30, a first inter-cell cooling circuit 15, and the other of the plates 10, 20 of the first cell 30 forms a first end plate.

One of the plates 10, 20 of the last cell 30 forms, with one of the plates 10, 20 of another of the cells 30, a last inter-cell cooling circuit 15, and the other of the plates 10, 20 of the last cell 30 forms a last end plate.

As shown in FIG. 1, the assembly 1 includes a closure plate 21 comprising an electric current collection plate intended to face a first electric current collection plate and a closure face fixed to the cooling face of the last end plate, the closure face and the cooling face of the last end plate defining between them relief elements and hollows to form a last cooling circuit for the circulation of the cooling fluid.

The assembly 1 further comprises a distribution plate 11 comprising an outer face intended to face a plate 17 forming an interface with cooling fluid inlet and outlet piping and with reactant fluid inlet and outlet piping, the distribution plate comprising an inner face fixed to the cooling face of the first end plate, the inner face and the cooling face of the first end plate defining relief elements and hollows between them to form a first cooling circuit for the circulation of the cooling fluid.

In the example of FIG. 1, the closure face is welded to the cooling face of the last end plate, and the inner face is welded to the cooling face of the first end plate.

In the example shown in FIG. 1, the closure face of the closure plate 21 comprises a reactant passage 12, 13 formed by relief elements and hollows, to allow fluid communication between the reactant inlet manifold 3, 4 and the reactant circuit or to allow fluid communication between the reactant outlet manifold 6, 7 and the reactant circuit.

The closure face of the closure plate 21 comprises a cooling passage 13 formed by relief elements and hollows, to allow fluid communication between the cooling fluid inlet manifold 5 and the cooling circuit, or to allow fluid communication between the cooling fluid outlet manifold 8, 9 and the cooling circuit.

The reactant passage 12, 13 and the cooling passage 13 may be arranged on the closure face, on the last end plate, or on both of these.

FIG. 2 shows a fuel cell comprising an assembly as described in FIG. 1.

The cell comprises a first collection plate, for collecting an electric current, the first collection plate having a face in contact with the collection face of the closure face 21 and another face in contact with a first electrically insulating plate 18.

In the embodiment of FIG. 2, the first electrically insulating plate 18 is flexible.

The first collection plate is arranged so as to be fitted into a receiving area formed on the collection face of the closure face 21.

The cell further comprises a plate 17 forming an interface with inlet and outlet piping for the cooling fluid and the reactant fluid.

The cell comprises a second electrically insulating plate. This second electrically insulating plate may take the form of a separate element from the interface plate 17 in contact with the interface plate 17, or the interface plate 17 may act as a second electrically insulating plate, notably by means of one of its faces in contact with the distribution plate 11.

In the example of FIG. 2, all of the piping is thus arranged on the same side of the stack, the other side being closed by the closure plate 21.

In the example depicted, the first end plate is an anode plate 10 and the last end plate is a cathode plate 20. In a variant, the first end plate is a cathode plate 20 and the last end plate is an anode plate 10.

As seen in FIG. 2, the assembly 1 is arranged so that all the fluid inlet and outlet piping is positioned at only one end of the stack. Thus the closure plate 21 is a plate that closes all the manifolds and orifices of the last end plate. Such a closure plate 21 enables a flat face to be provided for the collection of the electric current generated by the cell.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An assembly comprising a stack of a plurality of fuel cell cells of the proton exchange membrane type, the plurality of fuel cell cells comprising a first cell at a first end of the stack and a last cell at a second end of the stack, each cell of the plurality comprising an anode plate and a cathode plate sandwiching a membrane/electrode assembly, wherein each plate comprises:

a reactive face and a cooling face opposed to one another, the reactive face of each plate being configured to face the membrane/electrode assembly and being provided with relief elements and hollows forming a reactant circuit for the circulation of a reactant fluid, the cooling face of the cathode plate of at least one of the cells being configured to face the cooling face of the anode plate of another of the cells, defining between them relief elements and hollows to form an inter-cell cooling circuit for the circulation of a cooling fluid;

a reactant inlet manifold formed through the plate and being in fluid communication with the reactant circuit;

a reactant outlet manifold formed through the plate and being in fluid communication with the reactant circuit, a cooling fluid inlet manifold formed through the plate; and a cooling fluid outlet manifold formed through the plate, wherein one of the plates of the first cell forming, with one of the plates of another of the cells, a first inter-cell cooling circuit, wherein the other of the plates of the first cell forming a first end plate, one of the plates of the last cell forming, with one of the plates of another of the cells, a last inter-cell cooling circuit, wherein the other of the plates of the last cell forming a last end plate, the assembly comprising a closure plate comprising an electric current collection plate and a closure face fixed to the cooling face of the last end plate, the closure face and the cooling face of the last end plate defining between them relief elements and hollows configured to form a last cooling circuit for the circulation of the cooling fluid, the closure plate comprising an absence of a hole for the passage of the cooling fluid through the closure plate or for the passage of the reactant fluid through the closure plate.

2. The assembly as claimed in claim 1, the closure face being bonded or welded to the cooling face of the last end plate.

3. The assembly as claimed in claim 1, the closure face being fixed to the cooling face of the last end plate so as to form between them a first sealant bead of which at least one portion forms a loop around the cooling fluid inlet manifold.

4. The assembly as claimed in claim 1, the closure face being fixed to the cooling face of the last end plate so as form between them a second sealant bead of which at least one portion forms a loop around the cooling fluid outlet manifold.

5. The assembly as claimed in claim 1, the closure face being fixed to the cooling face of the last end plate so as to form a third sealant bead of which at least one portion forms a loop around the last cooling circuit.

6. The assembly as claimed in claim 1, the closure face being fixed to the cooling face of the last end plate so as to form a fourth sealant bead of which at least one portion forms a loop around the reactant inlet manifold.

7. The assembly as claimed in claim 1, the closure face being fixed to the cooling face of the last end plate so as to form a fifth sealant bead of which at least one portion forms a loop around the reactant outlet manifold.

8. The assembly as claimed in claim 1, further comprising a distribution plate comprising an outer face intended to face a plate forming an interface with inlet and outlet piping for the cooling fluid and with inlet and outlet piping for the reactant fluid, the distribution plate comprising an inner face fixed to the cooling face of the first end plate, the inner face and the cooling face of the first end plate defining between them relief elements and hollows for forming a first cooling circuit for the circulation of the cooling fluid, the inner face being notably bonded or welded to the cooling face of the first end plate.

9. The assembly as claimed in claim 1, the inner face being fixed to the cooling face of the first end plate so as to form between them a sixth sealant bead of which at least one portion forms a loop around the cooling fluid inlet manifold, and/or a seventh sealant bead of which at least one portion forms a loop around the cooling fluid outlet manifold, and/or an eighth sealant bead of which at least one portion forms a loop around the reactant fluid inlet manifold, and/or a ninth sealant bead of which at least one portion forms a loop around the reactant fluid inlet manifold.

10. The assembly as claimed in claim 1, further comprising: a first electric current collection plate, a second electric current collection plate and a plate forming an interface with inlet and outlet piping for the cooling fluid and the reactant fluid.

* * * * *